(12) United States Patent
Wang et al.

(10) Patent No.: US 7,702,412 B2
(45) Date of Patent: Apr. 20, 2010

(54) SYSTEM AND METHOD FOR CONTROLLING PRODUCT QUALITY

(75) Inventors: Chi-Chih Wang, Taipei Hsien (TW); Bing-Yu He, Shenzhen (CN); Yong-Hua Song, Shenzhen (CN)

(73) Assignees: Hon Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 232 days.

(21) Appl. No.: 11/945,271

(22) Filed: Nov. 27, 2007

(65) Prior Publication Data

US 2008/0228305 A1     Sep. 18, 2008

(30) Foreign Application Priority Data

Mar. 16, 2007     (CN) .................. 2007 1 0200297

(51) Int. Cl.
| | |
|---|---|
| G06F 19/00 | (2006.01) |
| G01N 37/00 | (2006.01) |
| G06F 15/00 | (2006.01) |
| G06F 11/30 | (2006.01) |
| G21C 17/00 | (2006.01) |
| G06G 1/14 | (2006.01) |
| G06Q 20/00 | (2006.01) |
| A01K 5/02 | (2006.01) |
| G06F 17/50 | (2006.01) |

(52) U.S. Cl. .................. 700/109; 700/99; 700/103; 700/106; 702/84; 702/182; 705/22; 705/29

(58) Field of Classification Search .................. 700/83, 700/95, 97, 99, 100, 103, 105, 106, 108–110, 700/143; 702/81, 84, 181–185, 187; 705/1, 705/22, 27–29; 715/764
See application file for complete search history.

(56) References Cited

U.S. PATENT DOCUMENTS

| | | | | |
|---|---|---|---|---|
| 5,440,478 | A | * | 8/1995 | Fisher et al. ................. 700/109 |
| 6,240,329 | B1 | * | 5/2001 | Sun ............................ 700/110 |
| 6,757,580 | B2 | * | 6/2004 | Shimada et al. ............. 700/108 |
| 6,784,973 | B1 | * | 8/2004 | Wozniak et al. ............... 355/40 |
| 7,123,981 | B2 | * | 10/2006 | Dollevoet et al. ........... 700/143 |
| 7,162,319 | B2 | * | 1/2007 | Popp et al. .................. 700/110 |
| 7,380,213 | B2 | * | 5/2008 | Pokorny et al. ............. 715/764 |
| 7,565,266 | B2 | * | 7/2009 | Yam et al. ................... 702/181 |

(Continued)

FOREIGN PATENT DOCUMENTS

JP          2004078716 A   *   3/2004

*Primary Examiner*—Crystal J Barnes-Bullock
(74) *Attorney, Agent, or Firm*—Frank R. Niranjan

(57) ABSTRACT

A computer-based method for controlling product quality is disclosed. The method includes the steps of: detecting whether a quality of raw materials bought from at least one supplier are acceptable; detecting whether a quality of using materials used at a processing procedure are acceptable; detecting whether a quality of products being manufactured at the processing procedure are acceptable; receiving and storing a post-procedure report obtained by sampling the products after the processing procedure; repeating steps of detecting materials used at a processing procedure, detecting products being manufactured at the processing procedure, detecting the sampling products after the processing procedure, and completing the manufacturing if all the products are finished. A related system is also disclosed.

6 Claims, 3 Drawing Sheets

U.S. PATENT DOCUMENTS

2003/0069795 A1* 4/2003 Boyd et al. .................... 705/22
2003/0229464 A1 12/2003 Takanabe
2004/0128211 A1* 7/2004 Tsai ........................... 705/27
2004/0128303 A1* 7/2004 Wang ......................... 707/101
2006/0004585 A1* 1/2006 Shukosky et al. .............. 705/1
2007/0203604 A1* 8/2007 Chiu et al. ................... 700/109

* cited by examiner

SYSTEM AND METHOD FOR CONTROLLING PRODUCT QUALITY

BACKGROUND OF THE INVENTION

1. Field of the Invention

The present invention is related to a system and method for controlling product quality.

2. Description of Related Art

A mold production line is made up of processing procedure such as a molding processing procedure, a surface treating processing procedure, a baking varnish processing procedure, and an assembling processing procedure. To control the quality and to improve the productivity, it is essential to establish a method of managing the product quality. In recent years, a quality control system using a computer and a database is established.

An art of controlling product quality is disclosed in patent application such as US Pub. No. 20030229464, entitled "Quality control method and system on production line for fabricating products." This invention can be utilized to set a threshold value, issue an alarm if an absolute value of differences exceeds the threshold value, and give a notice to an associated plant section. However, the quality control in the prior art is processed during the manufacturing of the products, there is no quality control before and after the manufacturing of the products.

Therefore, what is needed is a system and method for controlling product quality which can control the products quality before and after the manufacturing of the products.

SUMMARY OF THE INVENTION

A system for controlling product quality is provided in accordance with a preferred embodiment. The system includes one or more client computers, an application server, and a database server. The application server connects to the one or more client computers and the database server through a network. The database server is configured for storing predetermined criteria for controlling the product quality. The application server includes a receiving module, a saving module, and a judging module. The receiving module is configured for receiving reports during the process of controlling the product quality from the one or more clients computers. The saving module is configured for saving the reports. The judging module is configured for analyzing whether items on the reports satisfy corresponding predetermined criteria stored in the database server.

A computer-based method for controlling product quality is also provided. The method includes the steps of: (a) receiving a raw materials report of materials purchased from at least one supplier, storing the raw materials report, and detecting whether a quality of the raw materials are acceptable by analyzing whether items on the raw materials report satisfies a predetermined raw materials criteria for the materials; (b) receiving a using materials report of materials used at a processing procedure if the materials purchased from the supplier are acceptable, storing the using materials report, and detecting whether a quality of the using materials used at a processing procedure are acceptable by analyzing whether items on the using materials report satisfies a predetermined using materials criteria for materials used at the processing procedure; (c) receiving a production status report of products being manufactured at the processing procedure if the materials used at the processing procedure are acceptable, storing the production status report, and detecting whether a quality of the products being manufactured at the processing procedure are acceptable by analyzing whether items on the production status report satisfies a predetermined production status criteria for products being manufactured at the processing procedure; (d) receiving a post-procedure report of sampled products after the processing procedure if the products being manufactured at the processing procedure are acceptable, and storing the post-procedure report; repeating the steps (b) to (d) and completing the manufacture of the products.

Other systems, methods, features, and advantages of the present invention will become apparent to one with skill in the art upon examination of the following drawings and detailed description.

DETAILED DESCRIPTION OF THE INVENTION

Figure 1:
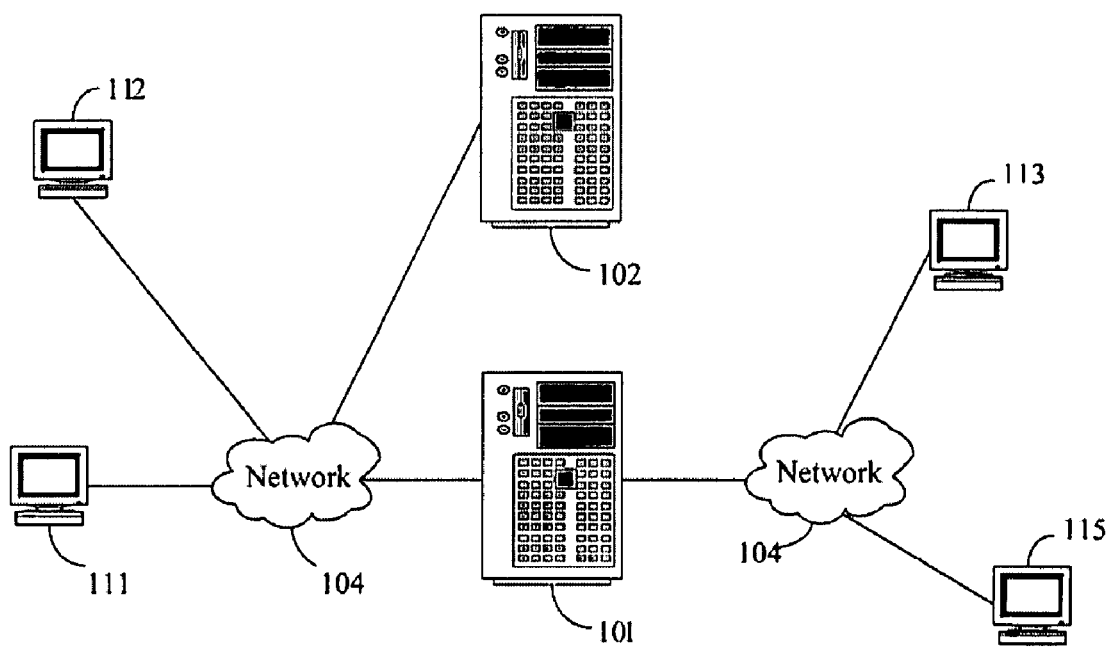
FIG. 1 is a schematic diagram of hardware configuration of a system for controlling product quality in accordance with a preferred embodiment.

FIG. 1 is a schematic diagram of hardware configuration of a system for controlling product quality (hereinafter, "the system") in accordance with a preferred embodiment. The system typically includes one or more client computers 111, 112, 113, and 115 located at different work stations, an application server 101, and a database server 102. The application server 101 connects to the client computers 111, 112, 113, 115 and the database server 102 through a network 104. Each of the client computers 111, 112, 113, and 115 can be a personal computer (PC) or a notebook. The application server 101 can be a blade server, a tower server or any other suitable kind of server. The database server 102 is configured for storing predetermined criteria for controlling the product quality. Normally, a mold product is manufactured through several processing procedures such as a molding processing procedure, a surface treating processing procedure, a baking varnish processing procedure and an assembling processing procedure. The predetermined criteria may include a predetermined raw materials criteria for materials purchased from at least one supplier, a predetermined using materials criteria for materials used at each of the processing procedures, a predetermined production status criteria for products being manufactured at each of the processing procedures, and a predetermined post-procedure criteria for sampled products after each of the processing procedures. The database server 102 is further configured for storing check items for the quality checking. For example, the check items in the assembling processing procedure may include an oil stain check item, a welding spot check item, an alveoli check item, and a hollow check item. The check items at each of the processing procedures are different.

The application server 101 is configured for receiving reports during the process of controlling the product quality from the clients computers 111, 112, 113, and 115, and analyzing whether items on the report satisfy a predetermined criteria stored in the database server 102.

Figure 2:
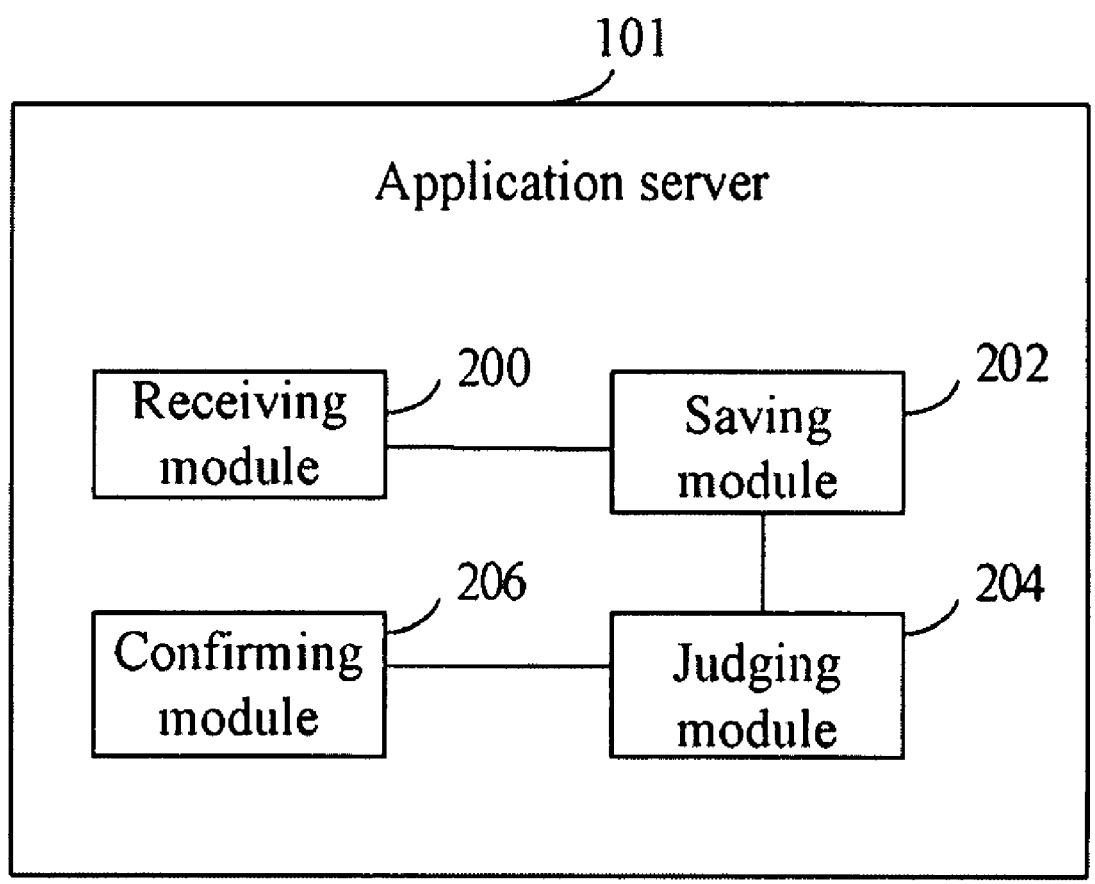
FIG. 2 is a schematic diagram showing function modules of an application server of the system of FIG. 1.

FIG. 2 is a schematic diagram showing function modules of the application server 101. The application server 101 may include a receiving module 200, a saving module 202, a judging module 204, and a confirming module 206.

The receiving module 200 is configured for receiving the reports from the client computers 111, 112, 113, and 115 through the network 104. The reports typically includes a raw materials report of materials purchased from at least one supplier, a using materials report of materials used at each of the processing procedures, a production status report of products being manufactured at each of the processing procedures, and a post-procedure report of sampled products after each of the processing procedures. Each of the reports may include check items and corresponding check results. For example, the check items on the using materials report may include an oil stain check item, a welding spot check item, an alveoli check item, a hollow check item, and corresponding check results.

The saving module 202 is configured for saving the reports in the application server 101. The judging module 204 is configured for detecting whether a quality of the raw materials purchased from at least one supplier are acceptable by analyzing whether items on the raw materials report satisfies a predetermined raw materials criteria for the materials; detecting whether a quality of the using materials used at a processing procedure are acceptable by analyzing whether items on the using materials report satisfies a predetermined using materials criteria for materials used at the processing procedure; detecting whether a quality of the products being manufactured at the processing procedure are acceptable by analyzing whether items on the production status report satisfies a predetermined production status criteria for products being manufactured at the processing procedure; and detecting whether a quality of the sampled products manufactured at the processing procedure are acceptable by analyzing whether items on the post-procedure report satisfies a predetermined post-procedure criteria for sampled products after the processing procedure.

The judging module 204 is further configured for judging whether the products are finished (i.e., judging whether all the processing procedures of each product are finished), and judging whether a customer returns any finished products.

The receiving module 200 is further configured for receiving a sales return record sent from one of the client computers 111, 112, 113, and 115 when any finished products are returned. The sales return record may include a fault of the product, and a type of the fault (i.e., a check item of the fault). The confirming module 206 can determine a processing procedure resulting in the returned products according to the sales return record and the reports, that is to say, the confirming module 206 can determine the processing procedure resulting in the fault of the product according to the check item of the fault.

The saving module 202 is further configured for storing the sales return record in the application server 101.

Figure 3:
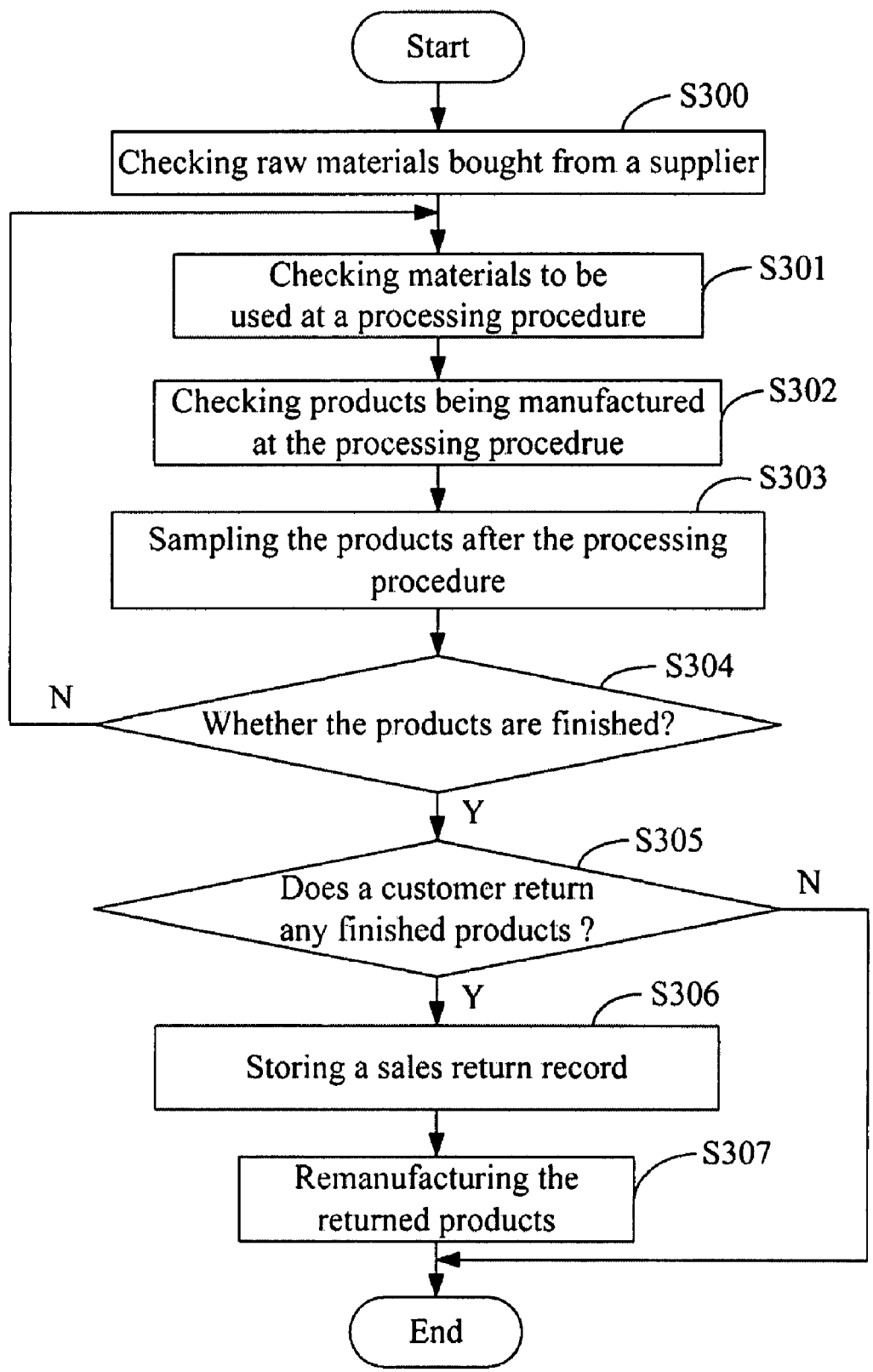
FIG. 3 is a flowchart of a preferred method for controlling product quality in accordance with one embodiment.

FIG. 3 is a flowchart of a preferred method for controlling product quality in accordance with one embodiment. In step S300, a quality control operator checks raw materials purchased from at least one supplier according to corresponding check items, and inputs corresponding check results using one of the client computers 111, 112, 113, and 115 thereby generating a raw materials report. For example, the check items in the raw materials report may include a physical form check item, a packaging check item, and a size check item. The receiving module 200 receives the raw materials report from the client computer through the network 104. The saving module 202 stores the raw materials report in the application server 101. Then, the judging module 204 detects whether a quality of the raw materials are acceptable by analyzing whether items on the raw materials report satisfies a predetermined raw materials criteria for the materials. If the items on the raw materials report does not satisfy the predetermined raw materials criteria, the judging module 204 detects the quality of the raw materials are not acceptable, and the quality control operator returns the raw materials to the supplier. If the items on the raw materials report satisfies the predetermined raw materials criteria, the judging module 204 detects the quality of the raw materials are acceptable, the procedure go to step S301.

In step S301, a quality control operator located at one of the client computers 111, 112, 113, and 115 checks using materials used at a processing procedure according to corresponding check items, and inputs corresponding check results using the client computer thereby generating a using materials report. For example, the check items on the using materials report may include an oil stain check item, a welding spot check item, an alveoli check item, and a hollow check item. The receiving module 200 receives the using materials report through the network 104. The saving module 202 stores the using materials report in the application server 101. Then, the judging module 204 detects whether a quality of the using materials used at the processing procedure are acceptable by analyzing whether items on the using materials report satisfies a predetermined using materials criteria for materials used at the processing procedure. If the items on the using materials report does not satisfy the predetermined using materials criteria, the judging module 204 detects the quality of the using materials used at the processing procedure are not acceptable, and the quality control operator returns the materials to a warehouse of the manufacturer. If the items on the using materials report satisfies the predetermined using materials criteria, the judging module 204 detects the quality of the using materials used at the processing procedure are acceptable, the procedure go to step S302.

In step S302, a operator located at one of the client computers 111, 112, 113, and 115 checks products being manufactured at the processing procedure according to corresponding checking items, and inputs corresponding check results using the client computer thereby generating a production status report. The receiving module 200 receives the production status report through the network 104. The saving module 202 stores the production status report in the application server 101. Then, the judging module 204 detects whether a quality of the products being manufactured at the processing procedure are acceptable by analyzing whether items on the production status report satisfies a predetermined production status criteria for products being manufactured at the processing procedure. If the items on the production status report does not satisfy the predetermined production status criteria, the judging module 204 detects the quality of the products being manufactured at the processing procedure are not acceptable, the operator rejects the products. If the items on the production status report satisfies the predetermined production status criteria, the judging module 204 detects the quality of the products being manufactured at the processing procedure are acceptable, the procedure go to step S303.

In step S303, a quality control operator located at one of the client computers 111, 112, 113, and 115 checks the products manufactured at the processing procedure by sampling according to corresponding check items, and inputs the corresponding check results using the client computer thereby generating a post-procedure report. The receiving module 200 receives the post-procedure report through the network 104. The saving module 202 stores the post-procedure report in the application server 101.

In step S304, the judging module 204 determines whether the products are finished (i.e., judging whether all the processing procedures of each product are finished). If the products are not finished, the procedure goes to step S301.

If all the products are finished, in step S305, the judging module 204 judges whether a customer returns any finished products. If there is no finished product is returned, the procedure ends.

If any finished product are returned, in step S306, a service center operator inputs a sales return record using the client computers 111, 112, 113, and 115. The sales return record may include a fault of the product, and a type of the fault (i.e., a check item of the fault). Then, the receiving module 200 receives the sales return record through the network 104. The saving module 202 stores the sales return record in the application server 101.

In step S307, the confirming module 206 determines a processing procedure resulting in the returned products according to the sales return record and the reports (the reports in step S300 to step S303), that is to say, the confirming module 206 determines the processing procedure resulting in the fault of the products according to the check item of the fault. Then, the service center operator returns the products to a manufacture department. The manufacture department remanufactures the returned products (step S300 to step S303).

It should be emphasized that the above-described embodiments of the present invention, particularly, any preferred embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for controlling product quality, the system comprising one or more client computers, an application server and a database server, the application server being connected to the one or more client computers and the database server through a network, the database server being configured for storing predetermined criteria for controlling the product quality, the application server comprising:
   a receiving module configured for receiving reports during the process of controlling the product quality from the one or more clients computers;
   a saving module configured for saving the reports;
   a judging module configured for analyzing whether items on the reports satisfy corresponding predetermined criteria stored in the database server;
   the judging module is further configured for judging whether a customer returns any finished products;
   the receiving module is further configured for receiving a sales return record when any finished products are returned; and
   the saving module is further configured for storing the sales return record in the application server.

2. The system according to claim 1, wherein the application server further comprises a confirming module configured for determining a processing procedure resulting in the returned products according to the sales return record and the reports.

3. The system according to claim 1, wherein the predetermined criteria include a predetermined raw materials criteria for materials purchased from at least one supplier, a predetermined using materials criteria for materials used at each of the processing procedures, and a predetermined production status criteria for products being manufactured at each of the processing procedures.

4. The system according to claim 3, wherein the reports include a raw materials report of materials purchased from at least one supplier, a using materials report of materials used at each of the processing procedures, a production status report of products being manufactured at each of the processing procedures, and a post-procedure report of sampled products after each of the processing procedures.

5. A computer-based method for controlling product quality, the method being performed by execution of computer readable program code by at least one processor of at least one computer system, the method comprising:
   (a) receiving a raw materials report of materials purchased from at least one supplier, storing the raw materials report, and detecting whether a quality of the raw materials are acceptable by analyzing whether items on the raw materials report satisfies a predetermined raw materials criteria for the materials using the at least one processor;
   (b) receiving a using materials report of materials used at a processing procedure if the materials purchased from the supplier are acceptable, storing the using materials report, and detecting whether a quality of the using materials used at a processing procedure are acceptable by analyzing whether items on the using materials report satisfies a predetermined using materials criteria for materials used at the processing procedure using the at least one processor;
   (c) receiving a production status report of products being manufactured at the processing procedure if the materials used at the processing procedure are acceptable, storing the production status report, and detecting whether a quality of the products being manufactured at the processing procedure are acceptable by analyzing whether items on the production status report satisfies a predetermined production status criteria for products being manufactured at the processing procedure using the at least one processor;
   (d) receiving a post-procedure report of sampled products after the processing procedure if the products being manufactured at the processing procedure are acceptable, and storing the post-procedure report using the at least one processor; and
   repeating the steps (b) to (d) and completing the manufacture of the products using the at least one processor.

6. The method according to claim 5, further comprising:
   judging whether a customer returns any finished products;
   receiving a sales return record when any finished products are returned, storing the sales return record, and determining a processing procedure resulting in the returned products according to the sales return record and the reports.

* * * * *